(12) United States Patent
Yang

(10) Patent No.: US 9,407,142 B2
(45) Date of Patent: Aug. 2, 2016

(54) METHOD AND APPARATUS FOR CONTROLLING PROGRAMMABLE POWER CONVERTER

(71) Applicant: SYSTEM GENERAL CORPORATION, New Taipei (TW)

(72) Inventor: Ta-Yung Yang, Milpitas, CA (US)

(73) Assignee: FAIRCHILD (TAIWAN) CORPORATION, Taipei (TW)

(*) Notice: Subject to any disclaimer, the term of this patent is extended or adjusted under 35 U.S.C. 154(b) by 194 days.

(21) Appl. No.: 14/046,059

(22) Filed: Oct. 4, 2013

(65) Prior Publication Data

US 2014/0176095 A1  Jun. 26, 2014

Related U.S. Application Data

(60) Provisional application No. 61/740,475, filed on Dec. 21, 2012.

(51) Int. Cl.
| | |
|---|---|
| *H02M 3/158* | (2006.01) |
| *H02M 3/157* | (2006.01) |
| *G05F 1/46* | (2006.01) |
| *H02M 3/156* | (2006.01) |
| *H02M 1/00* | (2006.01) |

(52) U.S. Cl.
CPC .............. *H02M 3/157* (2013.01); *G05F 1/46* (2013.01); *H02M 3/156* (2013.01); *H02M 3/158* (2013.01); *H02M 2001/0025* (2013.01)

(58) Field of Classification Search
CPC ......................................................... H02M 3/158
USPC .................................. 323/271, 272, 273, 282
See application file for complete search history.

(56) References Cited

U.S. PATENT DOCUMENTS

| | | | |
|---|---|---|---|
| 6,693,575 B1* | 2/2004 | Yang et al. ..................... 341/155 |
| 8,077,423 B1* | 12/2011 | Rahgozar ............... G11B 21/02 |
| | | | 360/75 |
| 2005/0151571 A1* | 7/2005 | Brown et al. ................. 327/172 |
| 2009/0256537 A1* | 10/2009 | Sato et al. ..................... 323/272 |
| 2012/0169310 A1* | 7/2012 | Dearborn ............ H02M 3/1588 |
| | | | 323/271 |
| 2012/0268063 A1* | 10/2012 | Qiu et al. ....................... 320/107 |
| 2013/0148396 A1* | 6/2013 | Walters ......................... 363/126 |

* cited by examiner

*Primary Examiner* — Jeffrey Gblende
*Assistant Examiner* — Trinh Dang
(74) *Attorney, Agent, or Firm* — McClure, Qualey & Rodack, LLP

(57) ABSTRACT

The present invention provides a circuit for controlling a programmable power converter. The circuit includes a microcontroller, a controller, and a timer. The controller includes a voltage error amplifier. The micro-controller has a program memory and a data memory. The controller generates switching signals in response to a voltage-feedback signal for regulating an output voltage of the programmable power converter. The voltage error amplifier generates the voltage-feedback signal according to a voltage reference signal and the output voltage of the programmable power converter. A gain of the voltage error amplifier and a value of the reference signal are programmed by the micro-controller.

12 Claims, 7 Drawing Sheets

METHOD AND APPARATUS FOR CONTROLLING PROGRAMMABLE POWER CONVERTER

CROSS REFERENCE TO RELATED APPLICATIONS

This application claims the benefit of U.S. Provisional Application No. 61/740,475, filed on Dec. 21, 2012, the contents of which are incorporated herein by reference.

BACKGROUND OF THE INVENTION

1. Field of the Invention

The present invention relates to a programmable power converter, and, more specifically, the present invention relates to a method and apparatus for controlling the programmable power converter.

2. Description of the Related Art

Manufacturers of today's power converters for mobile devices, such as notebooks, cellular phones, and tablet computers, provide various designs to supply those mobile devices with different voltage and current characteristics. Therefore, users with multiple mobile devices are often required to carry all of power converters for providing power to each individual mobile device, which becomes a burden for the users who often carry those devices with them. Accordingly, a need for a power converter to resolve this inconvenience is a programmable capability to supply a wide range of an output voltage and an output current, such as 5V~20V and 0.5 A~5 A. The electrical characteristics can be selected by the users to determine which mobile device will be powered. However, programmable power converters are generally difficult to achieve good performances, e.g. high efficiency, fast loop response and good loop stability, etc.

BRIEF SUMMARY OF THE INVENTION

The objective of the present invention is to solve the aforementioned problem and achieve fast loop response with good loop stability and high efficiency for programmable power converters.

The present invention provides a circuit for controlling a programmable power converter. The circuit comprises a micro-controller, a controller, and a timer. The controller comprises a voltage error amplifier, an analog-to-digital converter, a current error amplifier, and a ramp-signal generator. The micro-controller has a program memory and a data memory. The controller generates switching signals in response to a voltage-feedback signal for regulating an output voltage of the programmable power converter. The voltage error amplifier of the controller generates the voltage-feedback signal according to a voltage reference signal and the output voltage of the programmable power converter. A gain of the voltage error amplifier and a value of the voltage reference signal are programmed by the micro-controller. The analog-to-digital converter of the controller is coupled to convert a level of an input voltage of the programmable power converter to a digital code. The micro-controller is coupled to read the digital code. The current error amplifier of the controller generates a current-feedback signal according to a current reference signal and an output current of the programmable power converter. The controller generates the switching signals according to the current feedback signal to regulate the output current of the programmable power converter. The ramp-signal generator of the controller generates ramping signals coupled to compare with the voltage feedback signal and the current feedback signal for generating the switching signals. The ramp-signal generator further generates a maximum on-time signal for determining a maximum on time of the switching signals. Slopes of the ramping signals are controlled by the micro-controller. The timer generates a frequency signal to determine a switching frequency of the switching signals. A frequency of the frequency signal is controlled by the micro-controller.

The present invention also provides a method for controlling a programmable power converter. The method comprises: generating switching signals in response to a voltage-feedback signal for regulating an output voltage of the programmable power converter; and generating the voltage-feedback signal by a voltage error amplifier according to a voltage reference signal and the output voltage of the programmable power converter, wherein the voltage reference signal and a frequency of the switching signals are programmed by a micro-controller, and the micro-controller includes a program memory and a data memory. The method further comprises: generating ramping signals coupled to compare with the voltage-feedback signal and a current-feedback signal for generating the switching signals, wherein slopes of the ramping signal are controlled by the micro-controller. The method also comprises: generating a maximum on-time signal coupled to determine a maximum on time of the switching signals, wherein the maximum on-time signal is controlled by the micro-controller. The method comprises: generating a light-load signal, coupled to control the switching signals for light load operation, wherein the light-load signal is controlled by the micro-controller. The method further comprises: generating a current-feedback signal by a current error amplifier according to a current reference signal and an output current of the programmable power converter, wherein the current-feedback signal is coupled to control the switching signals for regulating the output current of the programmable power converter, and the current reference signal is controlled by the micro-controller. A gain of the current error amplifier is controlled by the micro-controller. A gain of the voltage error amplifier is controlled by the micro-controller.

The present invention further provides a method and apparatus for controlling a programmable power converter. The method comprises: generating a switching signal in response to a voltage-feedback signal for regulating an output voltage of the programmable power converter; generating the switching signal in response to a current-feedback signal for regulating an output current of the programmable power converter; generating the voltage-feedback signal by a voltage error amplifier according to a voltage reference signal and the output voltage of the programmable power converter; generating the current-feedback signal by a current error amplifier according to a current reference signal and the output current of the programmable power converter, wherein the voltage reference signal and the current reference signal are programmed by a micro-controller, and the micro-controller includes a program memory and a data memory. The micro-controller has a communication interface to communicate with I/O (input/output) devices.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
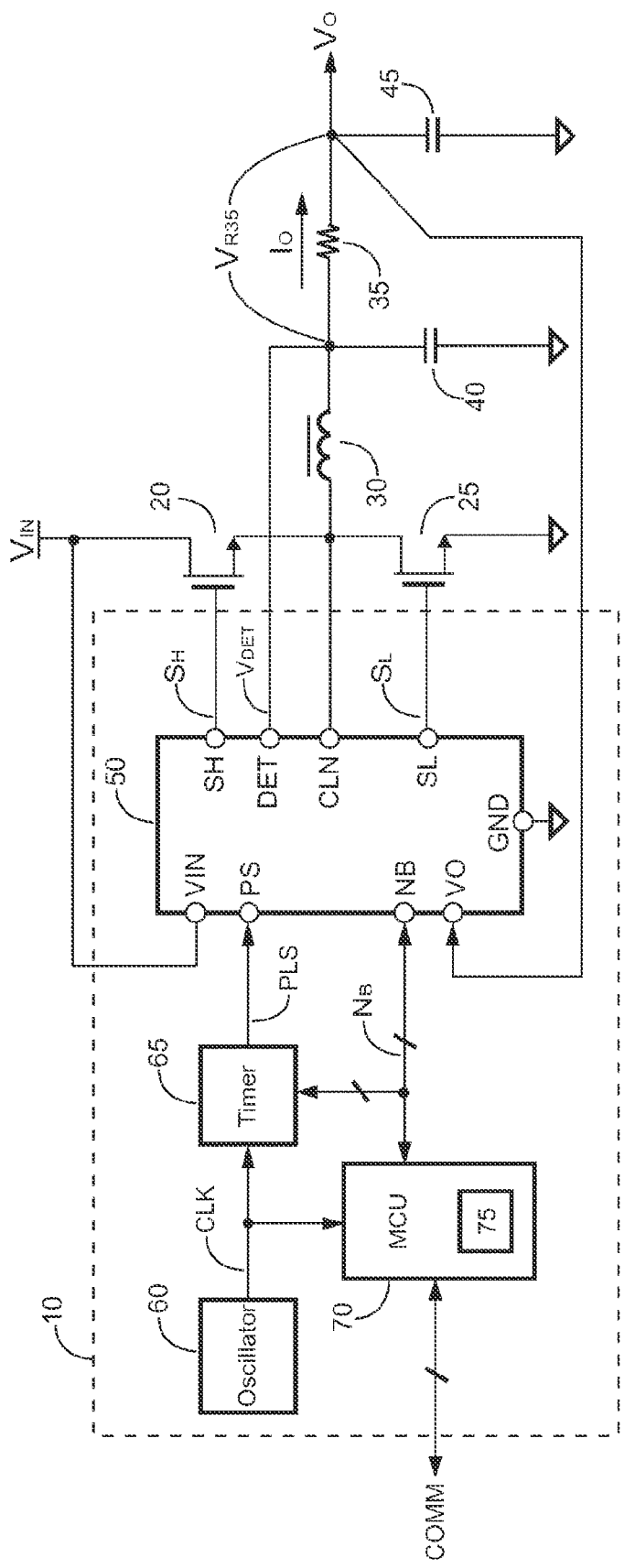
FIG. 1 shows an exemplary embodiment of a programmable power converter according to the present invention.

FIG. 1 shows an exemplary embodiment of a programmable power converter according to the present invention. A control circuit 10 comprises an oscillator 60, a micro-controller (MCU) 70, a timer 65, and a controller 50. The controller 50 comprises an input-voltage terminal VIN, an output-voltage terminal VO, driving terminals SH and SL, a frequency-input terminal PS, a detection terminal DET, a ground terminal GND, a floating ground terminal CLN, and a bus terminal NB. The control circuit 10 generates a high-side switching signal $S_H$ and a low-side switching signal $S_L$ coupled to drive a high-side transistor 20 and a low-side transistor 25, respectively, for regulating an output voltage $V_O$ and an output current $I_O$ of the programmable power converter. The transistors 20 and 25, capacitors 40 and 45, and an inductor 30 form a synchronous buck converter for generating the output voltage $V_O$ from an input voltage $V_{IN}$. A current-sense device, such as a resistor 35, is coupled to detect the output current $I_O$ for providing a current-sense signal $V_{DET}$ to the current-sense terminal DET of the controller 50. The current-sense signal $V_{DET}$ is correlated to the value of the output current $I_O$. The terminal CLN of the controller 50 is a floating ground terminal for the high-side transistor 20.

The embedded micro-controller 70 comprises a memory circuit 75 including a program memory and a data memory. The micro-controller 70 is coupled to control the timer 65 and the controller 50 through a control bus $N_B$. In accordance with the output voltage $V_O$, the current-sense signal $V_{DET}$, and the command of the micro-controller 70 transmitted via the control bus $N_B$, the control circuit 50 generates the high-side switching signal $S_H$ and the low-side switching signal $S_L$ for generating the output voltage $V_O$ and the output current $I_O$. The micro-controller 70 further comprises a communication interface COMM to communicate with host and/or I/O (input/output) devices. The timer 65 is coupled to receive a clock signal CLK generated from the oscillator 60 and receive the command from micro-controller 70 via the control bus $N_B$ for generating a frequency signal PLS. The frequency and the pulse width of the frequency signal PLS are programmable and are controlled by the micro-controller 70. The frequency signal PLS is coupled to the frequency-input terminal PS of the controller 50 for determining the frequency of the switching signals $S_H$ and $S_L$.

Figure 2:
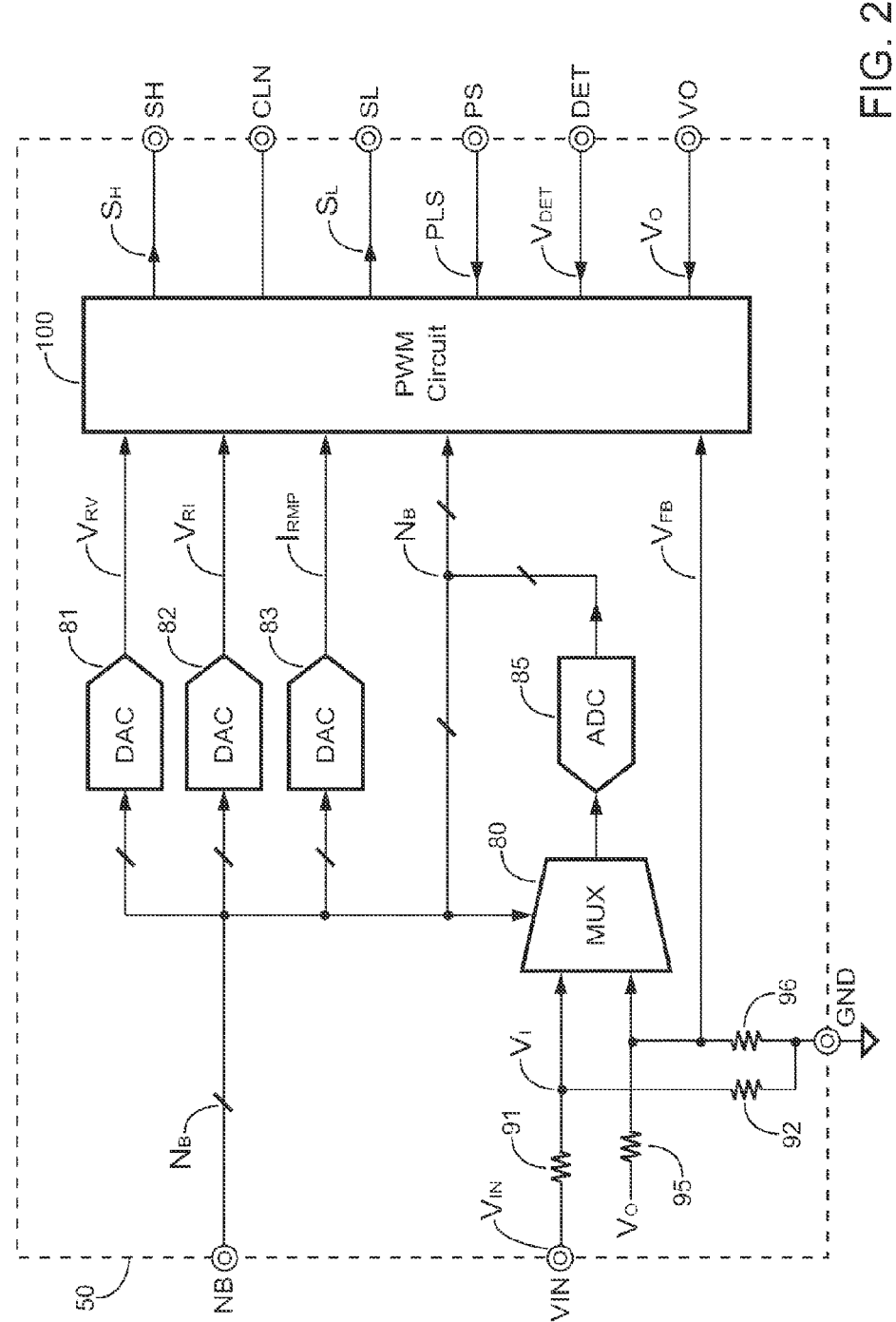
FIG. 2 shows an exemplary embodiment of a controller of the programmable power converter in FIG. 1 according to the present invention.

FIG. 2 shows an exemplary embodiment of the controller 50 of the programmable power converter according to the present invention. The controller 50 comprises a first voltage divider, a second voltage divider, a multiplexer (MUX) 80, digital-to-analog converters (DAC) 81, 82, and 83, an analog-to-digital converter (ADC) 85, and a PWM (pulse width modulation) circuit 100. The control bus $N_B$ is coupled to control the multiplexer 80, the digital-to-analog converters 81, 82, and 83, and the analog-to-digital converter 85. The input voltage $V_{IN}$ is coupled to generate an input-voltage signal $V_I$ through the first voltage divider formed by resistors 91 and 92. Thus, the input-voltage signal $V_I$ represents the level of the input voltage $V_{IN}$. The input-voltage signal $V_I$ is coupled to the multiplexer 80. Resistors 95 and 96 develop the second voltage divider to generate a feedback signal $V_{FB}$ in accordance with the output voltage $V_O$. Thus, the feedback signal $V_{FB}$ represents the level of the output voltage $V_O$. The feedback signal $V_{FB}$ is coupled to the multiplexer 80. The output of the multiplexer 80 is coupled to the analog-to-digital converter 85. When the output of the multiplexer 80 is the input-voltage signal $V_I$ representing the level of the input voltage $V_{IN}$, the analog-to-digital converter 85 converts the input-voltage signal $V_I$ to a digital code. When the output of the multiplexer 80 is the feedback signal $V_{FB}$ representing the level of the output voltage $V_O$, the analog-to-digital converter 85 converts the feedback signal $V_{FB}$ to a digital code. Therefore, via the control bus $N_B$, the micro-controller 70 can read the voltage information of the input voltage $V_{IN}$ and the output voltage $V_O$ through the digital code from the analog-to-digital converter 85. The micro-controller 70 also controls the output of the digital-to-analog converters 81, 82, and 83. The digital-to-analog converter 81 generates a reference signal (also referred to as "voltage reference signal") $V_{RV}$ for controlling the output voltage $V_O$. The digital-to-analog converter 82 generates a reference signal (also referred to as "current reference signal") $V_{RI}$ for controlling the output current $I_O$. The digital-to-analog converter 83 generates a ramping current $I_{RMP}$ for controlling ramping signals RMPV and RMPI (shown in FIG. 3). According to the above description, the reference signal $V_{RV}$, the reference signal $V_{RI}$, and the ramping current $I_{RMP}$ are programmed by the micro-controller 70 through the control bus $N_B$. The micro-controller 70 controls the ramping current $I_{RMP}$ in response to the level of the input voltage $V_{IN}$. The ramping signals RMPV and RMPI are coupled to generate the switching signals $S_H$ and $S_L$. The PWM circuit 100 is coupled to the floating ground terminal CLN and generates the switching signals $S_H$ and $S_L$ according to the output voltage $V_O$, the current-sense signal $V_{DET}$, the frequency signal PLS, the feedback signal $V_{FB}$, the reference signal $V_{RV}$, the reference signal $V_{RI}$, and the ramping current $I_{RMP}$.

Figure 3:
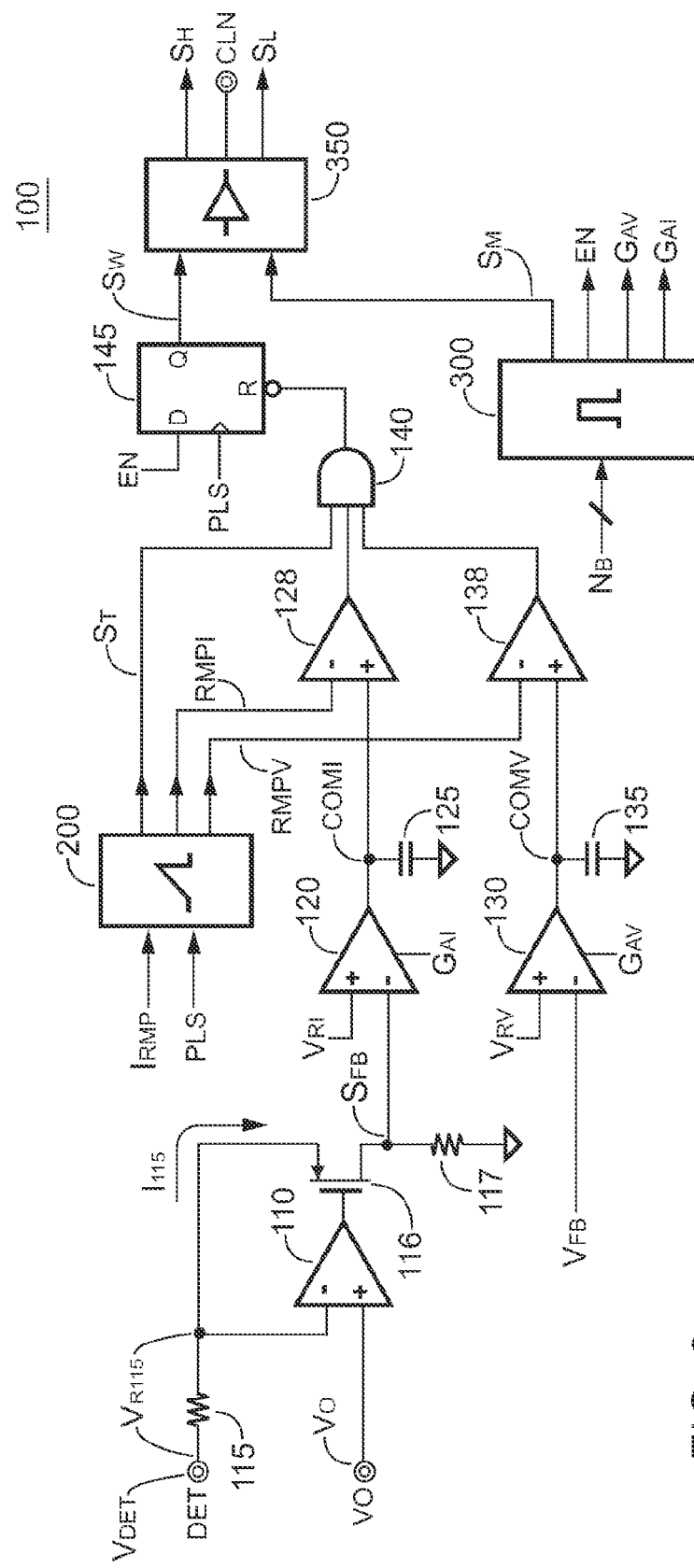
FIG. 3 shows an exemplary embodiment of a PWM circuit of the controller in FIG. 2 according to the present invention.

FIG. 3 shows an exemplary embodiment of the PWM circuit 100 according to the present invention. The PWM circuit 100 comprises resistors 115 and 117, an operational amplifier 110, a transistor 116, error amplifiers 120 and 130, capacitors 125 and 135, comparators 128 and 138, a ramp-signal generator 200, an AND gate 140, a flip-flop 145, a signal generator 300, and an output driver 350. The operational amplifier 110 is applied to drive the transistor 116 and generate a current $I_{115}$ flowing through resistors 115 and 117. Based on the virtual ground theory of the operational amplifier 110, a voltage level $V_{R115}$ generated across the resistor 115 will be regulated the same as the voltage level $V_{R35}$ which is the voltage generated across the resistor 35 and will be equal to the voltage between the terminals DET and VO.

$$V_{R35} = I_O \times R_{35} \quad (1)$$

$$V_{R35} = V_{R115} \quad (2)$$

$$I_{115} = \frac{V_{R35}}{R_{115}} \quad (3)$$

$$S_{FB} = I_{115} \times R_{117} = I_O \times \frac{R_{35}}{R_{115}} \times R_{117} \quad (4)$$

According to Equations (1)-(4), a feedback signal $S_{FB}$ with a voltage level generated across the resistor 117 is thus related to the output current $I_O$. The feedback signal $S_{FB}$ is supplied to the error amplifier (also referred to as "current error amplifier") 120 to be compared with the reference signal $V_{RI}$ for generating a current-feedback signal COMI at the output of the error amplifier 120. The capacitor 125 is coupled to the output of the error amplifier 120 for frequency compensation of a current feedback loop. The gain of the error amplifier 120 is programmed by a gain-adjusting signal $G_{AI}$. The feedback signal $V_{FB}$ is supplied to the error amplifier (also referred to as "voltage error amplifier") 130 to be compared with the reference signal $V_{RV}$ for generating a voltage-feedback signal COMV at the output of the error amplifier 130. The capacitor 135 is coupled to the output of the error amplifier 130 for frequency compensation of a voltage feedback loop. The gain of the error amplifier 130 is determined by another gain-adjusting signal $G_{AV}$. The current-feedback signal COMI is used for regulating the output current $I_O$. The voltage-feedback signal COMV is used for regulating the output voltage $V_O$. The control bus $N_B$ is coupled to the signal generator 300 for generating an enabling signal EN, a light-load signal $S_M$, and the gain-adjusting signals $G_{AV}$ and $G_{AI}$ in response to the control of the micro-controller 70. The enabling signal EN and the frequency signal PLS are coupled to generate a switching signal $S_W$ via the flip-flop 145.

The ramping current $I_{RMP}$ and the frequency signal PLS are coupled to the ramp-signal generator 200 for generating the ramping signals RMPV and RMPI and a maximum on-time signal $S_T$. The maximum on-time signal $S_T$ determines the maximum on time of the high-side switching signal $S_H$ and the low-side switching signal $S_L$. The ramping signals RMPV and RMPI are synchronized with the frequency signal PLS. The slope of the ramping signals RMPV and RMPI and the period of the maximum on-time signal $S_T$ are determined by the level of the ramping current $I_{RMP}$. The ramping signal RMPV is supplied to the comparator 138 to be compared with the voltage-feedback signal COMV. The ramping signal RMPI is supplied to the comparator 128 to be compared with the current-feedback signal COMI. The output of the comparators 128 and 138 and the maximum on-time signal $S_T$ are coupled to disable the switching signal $S_W$ through the AND gate 140 and the flip-flop 145. The switching signal $S_W$ is further coupled to generate the high-side switching signal $S_H$ and the low-side switching signal $S_L$ through the output driver 350. The light-load signal $S_M$ is utilized to disable the low-side switching signal $S_L$ for light load operation.

Figure 4:
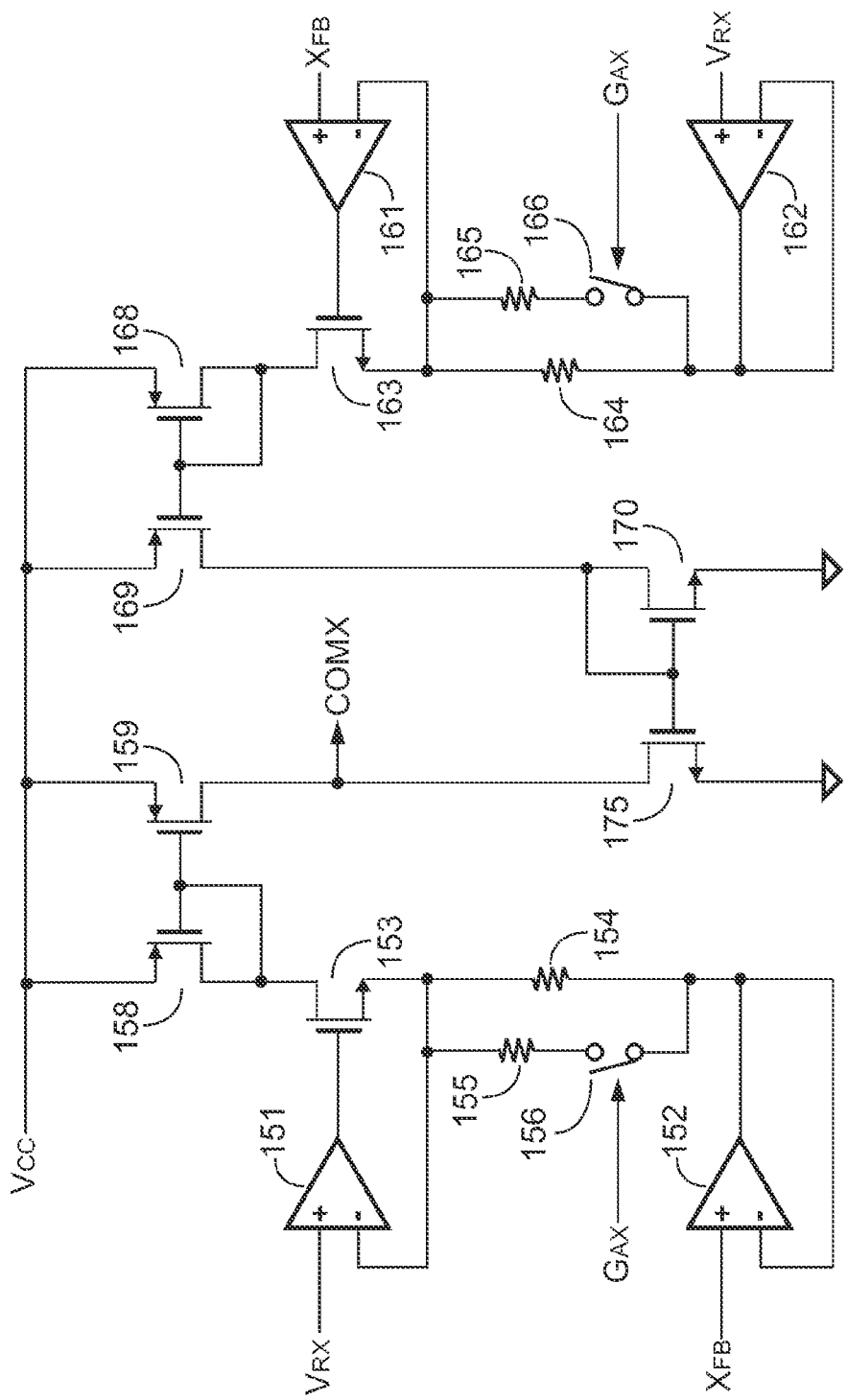
FIG. 4 shows an exemplary embodiment of an error amplifier in the PWM circuit in FIG. 3 according to the present invention.

FIG. 4 shows an exemplary embodiment of an error amplifier in the PWM circuit 100 according to the present invention. The error amplifiers 120 and 130 in FIG. 3 are embodied as shown in FIG. 4. The error amplifier comprises operational amplifiers 151, 152, 161, and 162, resistors 154, 155, 164, and 165, switches 156 and 166, and transistors 153, 158, 159, 163, 168, 169, 170, and 175. When the feedback signal $X_{FB}$ ($V_{FB}$, $S_{FB}$) is lower than the reference signal $V_{RX}$ ($V_{RV}$, $V_{RI}$), the output of the error amplifier COMX (COMV, COMI) can be shown as, $$COMX = Z_{COM} \times K_M \times \frac{V_{RX} - X_{FB}}{R_X} \quad (5)$$

When the feedback signal $X_{FB}$ is higher than the reference signal $V_{RX}$, the output of the error amplifier COMX can be shown as, $$COMX = Z_{COM} \times K_N \times \frac{X_{FB} - V_{RX}}{R_Y} \quad (6)$$

If $K_N = K_M$ and $R_Y = R_X$, then the gain of the error amplifier (error amplifiers 120, 130) can be shown as, $$\frac{\partial COMX}{\partial V_{RX}} = \pm \left( Z_{COM} \times K_M \times \frac{1}{R_X} \right) \quad (7)$$

where $Z_{COM}$ is the output impedance of the error amplifier; $K_M$ is a constant determined by the current mirror formed by the transistors 158 and 159; $K_N$ is a constant determined by the current mirror formed by the transistors 168, 169, 170, and 175; $R_X$ is the resistance of the resistor 154 or an equivalent resistance of "the resistor 154 connected with the resistor 155 in parallel" (if the switch 156 is turned on by the gain-adjusting signal $G_{AX}$, for example $G_{AV}$ or $G_{AI}$); $R_Y$ is the resistance of the resistor 164 or an equivalent resistance of "the resistor 164 connected with the resistor 165 in parallel" (if the switch 166 is turned on by the gain-adjusting signal $G_{AX}$). The gain of the error amplifier can be adjusted by programming the resistance of the resistor $R_X$.

Figure 5:
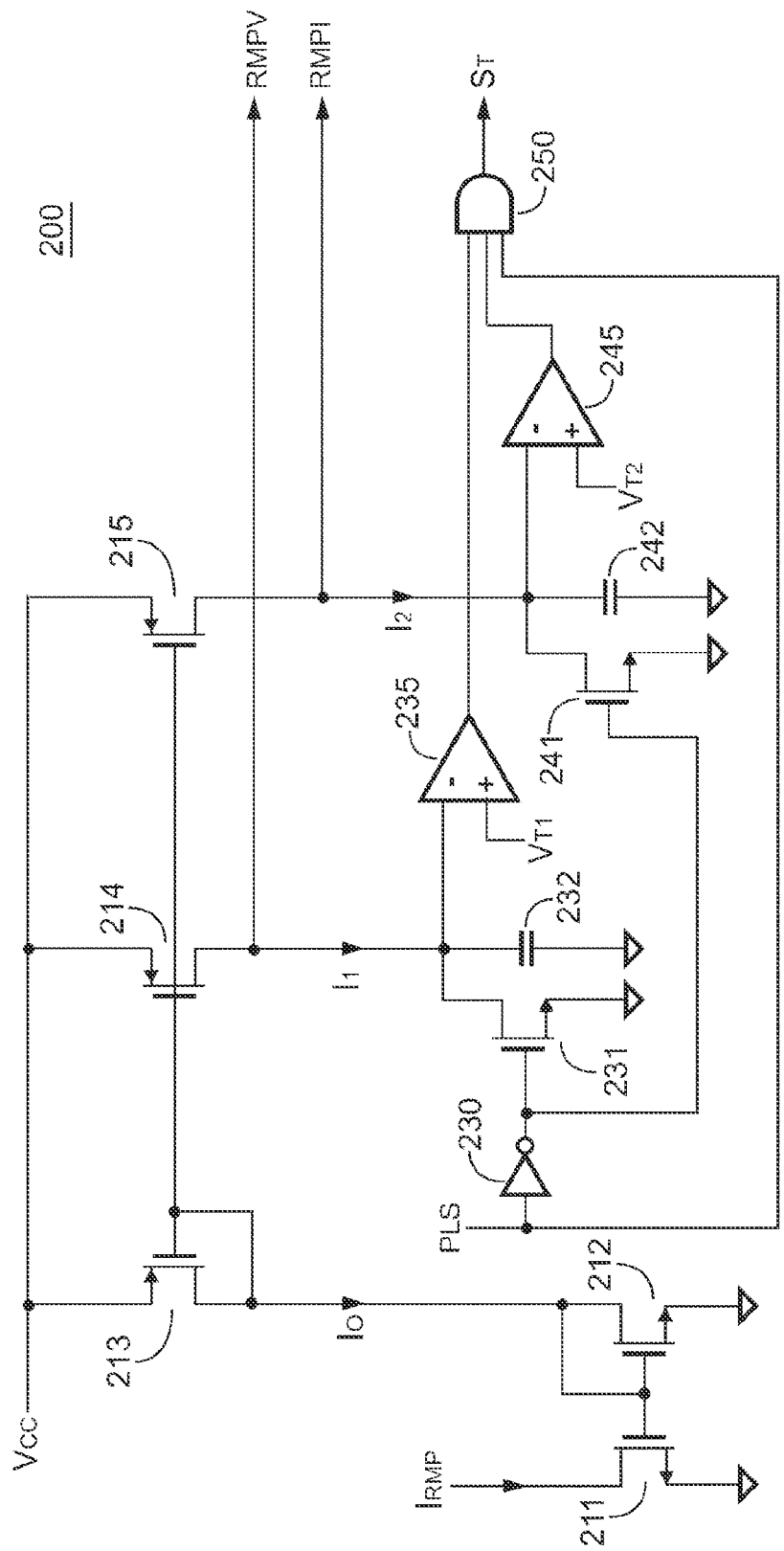
FIG. 5 shows an exemplary embodiment of a ramp-signal generator of the PWM circuit in FIG. 3 according to the present invention.

FIG. 5 shows an embodiment of the ramp-signal generator 200 of the PWM circuit 100 according to the present invention. The ramp-signal generator 200 comprises transistors 211, 212, 213, 214, 215, 231, and 241, an inverter 230, an AND gate 250, comparators 235 and 245, and capacitors 232 and 242. The transistors 211, 212, 213, 214, and 215 form a current mirror. The ramping current $I_{RMP}$ is supplied to a drain of the transistor 211 to generate current signals $I_1$ and $I_2$ via the drains of the transistors 214 and 215, respectively. The current signal $I_1$ associated with the capacitor 232 generates the ramping signal RMPV. The frequency signal PLS is coupled to discharge the capacitor 232 via the inverter 230 and the transistor 231. Once the ramping signal RMPV is higher than a threshold $V_{TT}$, the comparator 235 will enable the maximum on-time signal $S_T$ via the AND gate 250. The current signal $I_2$ associated with the capacitor 242 generates the ramping signal RMPI. The frequency signal PLS is coupled to discharge the capacitor 242 via the inverter 230 and the transistor 241. Once the signal RMPI is higher than a threshold $V_{T2}$, the comparator 245 will enable the maximum on-time signal $S_T$ via the AND gate 250. The frequency signal PLS is further coupled to enable the maximum on-time signal $S_T$ via the AND gate 250. The slope (slew rate) of the ramping signal RMPV is determined by the current signal $I_1$ and the capacitance of the capacitor 232. The slope (slew rate) of the ramping signal RMPI is determined by the current signal $I_2$ and the capacitance of the capacitor 242.

Figure 6:
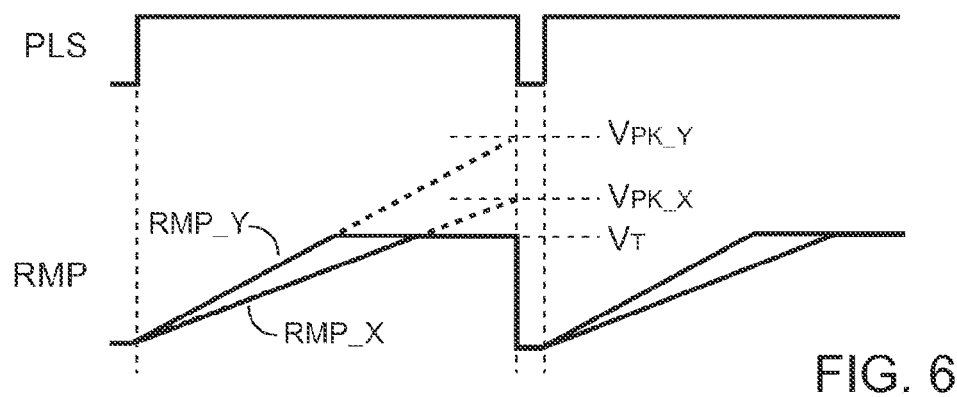
FIG. 6, FIG. 6A, FIG. 6B show waveforms of a frequency signal and ramping signals according to the present invention.
Figure 6A:
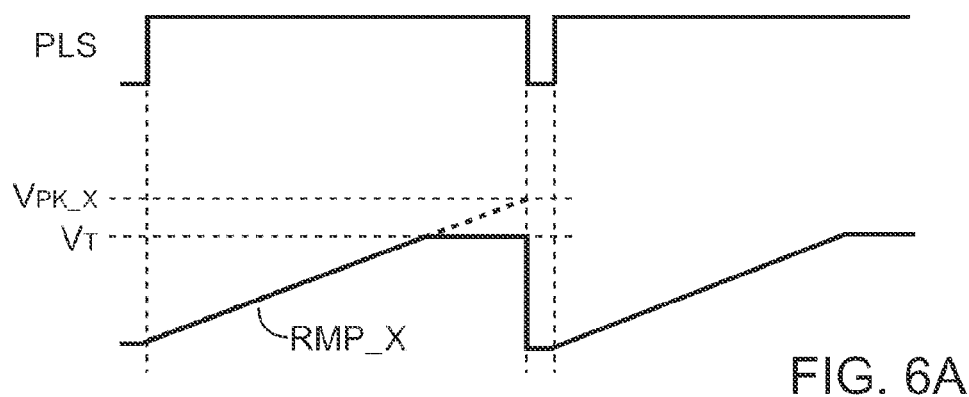
Figure 6B:
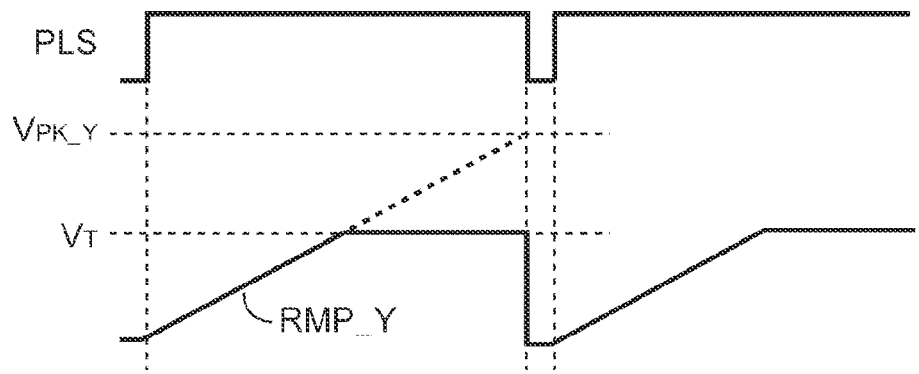

FIG. 6, FIG. 6A, and FIG. 6B show the waveforms of the frequency signal PLS and the ramping signal RMP (RMPV, RMPI) according to the present invention. The slew rate of a ramping signal RMP_Y is higher than that of a ramping signal RMP_X. A value $V_{PK\_Y}$ and a value $V_{PK\_X}$ represent the equivalent maximum values of the ramping signal RMP_Y and the ramping signal RMP_X respectively. Once the value of the ramping signal RMP reaches the threshold $V_T$ ($V_{T1}$, $V_{T2}$), the maximum on-time signal $S_T$ will be generated to disable the switching signal $S_W$.

The gain of the pulse width modulation (PWM) can be expressed as, $$\frac{\partial V_O}{\partial COMX} = \frac{\partial V_O}{\partial T_{ON}} \times \frac{\partial T_{ON}}{\partial COMX} \qquad (8)$$

The output voltage $V_O$ is controlled by the on time $T_{ON}$ of the switching signal $S_W$, $$V_O = V_{IN} \times \frac{T_{ON}}{T} \qquad (9)$$

$$\frac{\partial V_O}{\partial T_{ON}} = \frac{V_{IN}}{T} \qquad (10)$$

The feedback signals COMX (COMV and COMI) will determine the on time $T_{ON}$ of the switching signal $S_W$, which can be expressed as, $$COMX = V_{PK} \times \frac{T_{ON}}{T} \qquad (11)$$

The equation (11) can be rewritten as, $$T_{ON} = T \times \frac{COMX}{V_{PK}} \qquad (12)$$

$$\frac{\partial T_{ON}}{\partial COMX} = \frac{T}{V_{PK}} \qquad (13)$$

Therefore, the gain of the PWM can be shown by equation 14.

$$\frac{\partial V_O}{\partial COMX} = \frac{V_{IN}}{V_{PK}} \qquad (14)$$

It is determined by the level of the input voltage $V_{IN}$ and the maximum value $V_{PK}$ of the ramping signal RMP (RMPV, RMPI). The maximum value $V_{PK}$ of the ramping signal RMP (RMPV, RMPI) represents the slope and/or slew rate of the ramping signal RMP (RMPV, RMPI). A higher maximum value of the ramping signal RMP (RMPV, RMPI) will achieve a lower PWM gain that improves the stability of the feedback loop.

Figure 7:
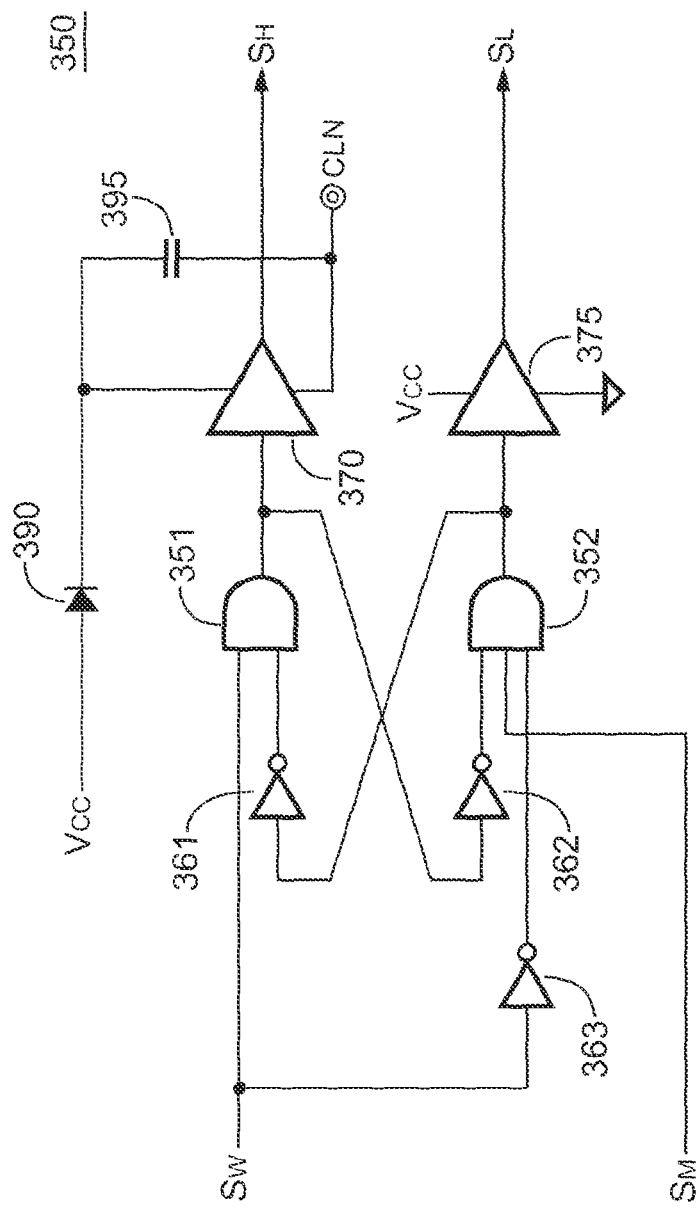
FIG. 7 shows an exemplary embodiment of an output driver of the PWM circuit in FIG. 3 according to the present invention.

FIG. 7 shows an embodiment of the output driver 350 according to the present invention. The output driver 350 comprises a diode 390, a capacitor 395, inverters 361, 362, and 363, AND gates 351 and 352, a high-side gate driver 370, and a low-side gate driver 375. The diode 390 and the capacitor 395 develop a charge pump circuit providing a power source for the high-side gate driver 370. The AND gates 351 and 352 and the inverters 361, 362, and 363 develop an exclusive-circuit coupled to receive the switching signal $S_W$ and prevent the switching signals $S_H$ and $S_L$ being enabled simultaneously. The light-load signal $S_M$ is coupled to disable the switching signal $S_L$ through the AND gate 352 and the low-side gate driver 375.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A circuit for controlling a programmable power converter, comprising:
    a micro-controller, having a program memory and a data memory; and
    a controller, generating switching signals in response to a voltage-feedback signal for regulating an output voltage of said programmable power converter, wherein said controller comprises:
    a voltage error amplifier, generating said voltage-feedback signal according to a voltage reference signal and said output voltage of said programmable power converters; and
    a current error amplifier, generating a current-feedback signal according to a current reference signal and an output current of said programmable power converter;
    wherein said controller generates said switching signals according to said current feedback signal to regulate said output current of said programmable power converter,
    wherein a gain of said voltage error amplifier and a value of said voltage reference signal are programmed by said micro-controller, and
    wherein a gain of said current error amplifier is controlled by said micro-controller.

2. The circuit as claimed in claim 1, wherein said controller further comprises:
    an analog-to-digital converter, coupled to convert a level of an input voltage of said programmable power converter to a digital code;
    wherein said micro-controller is coupled to read said digital code.

3. The circuit as claimed in claim 1, wherein said controller further comprises:
    a ramp-signal generator, generating ramping signals coupled to compare with said voltage feedback signal and said current feedback signal for generating said switching signals;
    wherein said ramp-signal generator further generates a maximum on-time signal for determining a maximum on time of said switching signals.

4. The circuit as claimed in claim 1, further comprising:
    a timer, generating a frequency signal to determine a switching frequency of said switching signals,
    wherein a frequency of said frequency signal is controlled by said micro-controller.

5. The circuit as claimed in claim 3, wherein slopes of said ramping signals are controlled by said micro-controller.

6. A method for controlling a programmable power converter, comprising:
    generating switching signals in response to a voltage-feedback signal for regulating an output voltage of said programmable power converter;

generating said voltage-feedback signal by a voltage error amplifier according to a voltage reference signal and said output voltage of said programmable power converter, and generating a current-feedback signal by a current error amplifier according to a current reference signal and an output current of said programmable power converter, wherein said current-feedback signal is coupled to control said switching signals for regulating said output current of said programmable power converter, wherein said voltage reference signal and a frequency of said switching signals are programmed by a micro-controller, and said micro-controller includes a program memory and a data memory, and wherein a gain of said voltage error amplifier is controlled by said micro-controller, and wherein said current reference signal is controlled by said micro-controller, and a pain of said current error amplifier is controlled by said micro-controller.

7. The method as claimed in claim 6, further comprising:
generating ramping signals coupled to compare with said voltage-feedback signal and a current-feedback signal for generating said switching signals, wherein slopes of said ramping signals are controlled by said micro-controller.

8. The method as claimed in claim 6, further comprising:
generating a maximum on-time signal coupled to determine a maximum on time of said switching signals, wherein said maximum on-time signal is controlled by said micro-controller.

9. The method as claimed in claim 6, further comprising:
generating a light-load signal, coupled to control said switching signals for light load operation, wherein said light-load signal is controlled by said micro-controller.

10. A method for controlling a programmable power converter, comprising:
generating a switching signal in response to a voltage-feedback signal for regulating an output voltage of said programmable power converter;

generating said switching signal in response to a current-feedback signal for regulating an output current of said programmable power converter;

generating said voltage-feedback signal by a voltage error amplifier according to a voltage reference signal and said output voltage of said programmable power converter; and generating said current-feedback signal by a current error amplifier according to a current reference signal and said output current of said programmable power converter, wherein said voltage reference signal and said current reference signal are programmed by a micro-controller, wherein said micro-controller includes a program memory and a data memory, and wherein a gain of said current error amplifier is controlled by said micro-controller.

11. The method as claimed in claim 10, wherein said micro-controller has a communication interface to communicate with I/O (input/output) devices.

12. The method as claimed in claim 10, wherein a gain of said voltage error amplifier is controlled by said micro-controller.

\* \* \* \* \*